United States Patent [19]
Bucher et al.

[11] Patent Number: 5,558,165
[45] Date of Patent: Sep. 24, 1996

[54] AGRICULTURAL SWEEP AND MOUNTING

[75] Inventors: David H. Bucher, Des Moines; David C. Winter, Johnston, both of Iowa

[73] Assignee: Deere & Company, Moline, Ill.

[21] Appl. No.: 537,160

[22] Filed: Sep. 15, 1995

[51] Int. Cl.$^6$ ................................................. A01B 15/00
[52] U.S. Cl. ........................................ 172/721; 172/730
[58] Field of Search ........................... 37/452, 453, 454, 37/455, 456, 458, 457; 403/109, 326, 334, 381; 172/721, 722, 724, 730, 762, 699, 700, 713

[56] References Cited

U.S. PATENT DOCUMENTS

| | | | |
|---|---|---|---|
| 2,595,353 | 11/1948 | Graham . | |
| 2,699,104 | 1/1955 | Jaeger | 172/724 |
| 2,729,902 | 1/1956 | Launder | 37/453 |
| 2,877,061 | 9/1956 | Blackwood . | |
| 3,007,533 | 11/1961 | Hill | 172/730 |
| 4,195,697 | 4/1980 | Griffin | 172/730 |
| 4,391,050 | 7/1983 | Smith et al. | 37/455 |
| 4,762,184 | 8/1988 | Yeomans | 37/454 X |
| 4,779,686 | 10/1988 | Ryan | 172/730 |
| 5,005,304 | 4/1991 | Briscoe et al. | 403/381 X |
| 5,027,535 | 7/1991 | Maguina-Larco | 37/455 |
| 5,465,796 | 11/1995 | Buesuher et al. | 172/762 |

OTHER PUBLICATIONS

Deere & Company, Co-pending application entitled "Shank Assembly with Knock-on Sweep", Ser. No. 08/232,541, filed 22 Apr. 1994–now U.S. Pat. No. 5,465,796.

*Primary Examiner*—Terry Lee Melius
*Assistant Examiner*—Robert Pezzuto

[57] ABSTRACT

Knock-on sweep mounting structure includes a combination of first and second tapers, and mating notch structure in the sweep connecting portion and in the mounting structure on the shank, to provide easy installation and prevent sweep loss. The notch structure facilitates easy connection of the sweep on the mounting structure by rotational movement of the sweep at a single narrowed attaching location between the tapers. Once on the mounting structure, the sweep can slide along the shank. By forcing the sweep upwardly, the sweep is wedge-locked in the field-working position on the first taper. The second taper, opposite in direction from the first taper, fits against the naturally occurring shape of the bottom of the sweep connecting portion to retain the sweep on the shank if the sweep is dislodged from the first taper. The combination of tapers with the notch structure located therebetween substantially reduces the possibility of a sweep accidentally falling off the shank.

22 Claims, 2 Drawing Sheets

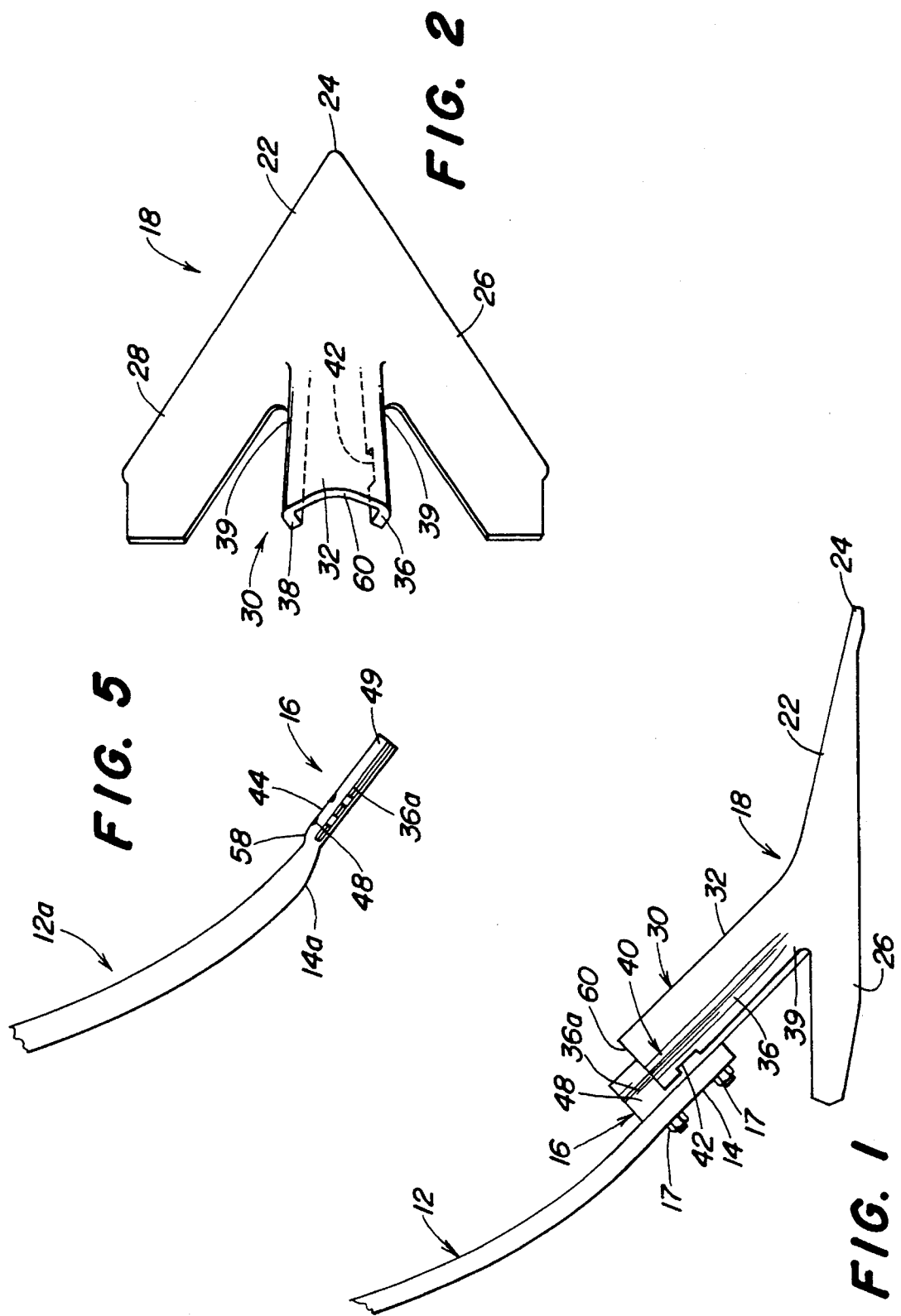

AGRICULTURAL SWEEP AND MOUNTING

BACKGROUND OF THE INVENTION

1) Field of the Invention

The present invention relates generally to tillage implements and, more specifically, to a sweep mounting arrangement providing easy mounting and removal of replaceable sweeps and substantially eliminating loss of sweeps from shanks.

2) Related Art

Knock-on sweeps currently available on the market utilize matching tapers on the sweep and on a mating adapter. Wedging action between the sweep and adapter hold the sweep on the shank during tillage operations. However, in some conditions the sweep can become dislodged from the taper on the adapter and be lost off the end of the shank. Dislodging of the sweep can occur when the implement is in transport or when a spring trip rebounds from a tripped condition during field-working operations. Some manufacturers provide extra clips which are added to the assembly to help retain the sweep. The clips add extra parts and expense to the assembly and are sometimes unreliable because of lack of durability and manufacturing tolerances that result in improper fit.

BRIEF SUMMARY OF THE INVENTION

It is an object of the present invention to provide an improved agricultural sweep mounting arrangement. It is a further object to provide such an arrangement which overcomes most or all of the aforementioned problems.

It is still another object of the present invention to provide an improved sweep mounting arrangement with friction fit between the sweep and shank. It is another object to provide such an arrangement which significantly reduces the incidences of dislodged sweeps being lost off the ends of the shanks. It is a further object to provide such a structure which obviates need for special clips or pins to retain the sweeps on the shanks.

It is a further object to provide an improved taper mount for a sweep. It is a further object to provide such a mount which prevents a dislodged sweep from falling off the end of the shank. It is still another object to provide such a mount which facilitates easy attachment and removal of a sweep relative to the shank.

It is yet another object of the present invention to provide an improved sweep for mounting on a shank. It is another object to provide such a sweep which can be easily rotated onto the shank and which can be wedged into a field-working position and retained without need for special retaining pins or clips or the like.

A knock-on sweep and shank portion include a combination of first and second tapers, and mating index or notch structure in the sweep connecting portion and in the mounting structure on the shank, to provide easy installation and prevent sweep loss. The notch structure facilitates easy connection of the sweep on the mounting structure by rotational movement at a preselected mounting location below an upper wedge-locked field-working position. A visual indicator is provided for alignment of the sweep at the mounting location.

Once on the mounting structure, the sweep is urged in a first direction away from the mounting location and wedge-locked in the field-working position on the first taper. The second taper, on the side of a narrowed portion in the mounting structure opposite from the first portion, fits against the naturally occurring shape of the bottom of the sweep connecting portion to retain the sweep on the shank when the sweep is dislodged from the first taper. The second taper prevents the sweep from falling off the end of the shank. The combination of tapers and the relatively narrow index or notch structure between the tapers substantially eliminates the possibility of a sweep accidentally falling off the shank while assuring easy rotational mounting and removal of a sweep. Special clips and mounting pins or other separate mounting hardware that add parts, cost and complexity are eliminated.

These and other objects, features and advantages of the present invention will become apparent to one skilled in the art upon reading the following detailed description in view of the drawings.

BRIEF DESCRIPTION OF THE DRAWINGS

FIG. 1 is a side view of a lower portion of a shank assembly with a tapered mounting adaptor attached thereto and a sweep frictionally engaging the adaptor.

FIG. 2 is a top view of the sweep shown in FIG. 1.

FIG. 5 is an alternate embodiment of the shank assembly having a mounting adaptor integral with an edge-bent shank.

DETAILED DESCRIPTION OF THE DRAWINGS

Figure 3:
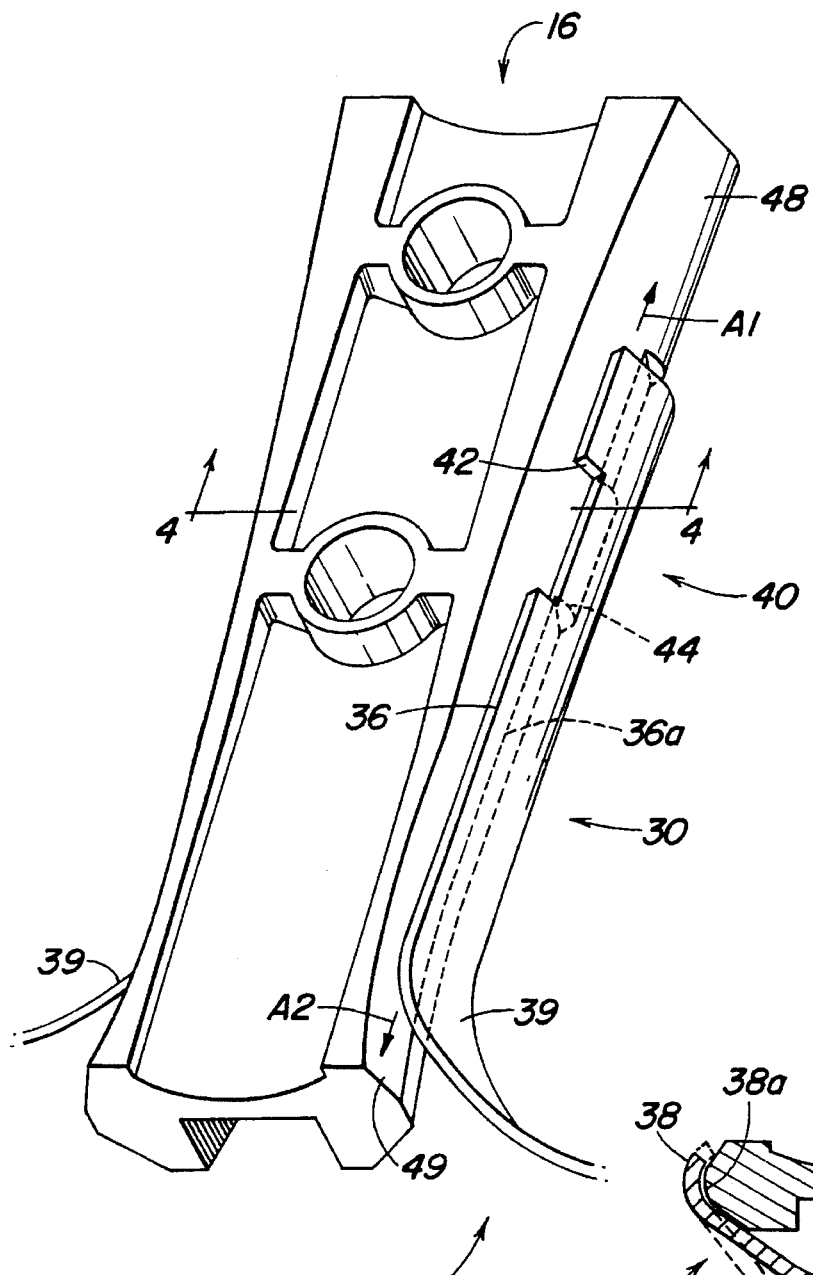
FIG. 3 is an enlarged rear perspective view of the adaptor of FIG. 1 and showing the sweep located at the mounting area of the adaptor prior to being wedged in the field-working position.

Referring now to FIG. 1, therein is shown a portion of a tillage implement 10 having an upright shank 12 with a lower sweep attaching end 14 with a double-taper adaptor 16 connected to the shank by bolts 17. A sweep 18 adapted for forward movement through the soil is supported on the end 14 by the adaptor 16. Alternatively (FIG. 5), the adaptor 16 is an integral portion of a lower end 14a of the shank 12a which as shown is an edge-bent shank.

The sweep 18 includes a lower earthworking portion 22 with a forwardmost point 24 and wings 26 and 28 angling rearwardly and outwardly from the point. At the rear of the portion 22 between the wings 26 and 28, a neck or connecting portion 30 extends upwardly and rearwardly. The connecting portion 30 has a rearwardly concave face 32 and extends laterally to rearwardly directed converging sides or flanges 36 and 38 adapted to embrace complimentary shaped sides 36a and 38a of the adaptor 16 (FIGS. 1 and 3) and permit limited sliding movement of the sweep 18 relative to the shank 12. The lower portion 22 and the connecting portion 30 are joined at flared transition areas 39.

The adaptor 16 and the connecting portion 30 include complimentary indexing structure, indicated generally at 40 in FIG. 3, to facilitate mounting and removal of the connecting portion 30, at a single mounting location (FIGS. 3 and 4) relative to the adaptor 16. Mounting and removal of the sweep 18 is achieved by positioning the sweep at the mounting location and moving the sweep 18 in a direction substantially different than that of the direction of the sliding movement of the sweep 18 along the shank 12.

Figure 4:
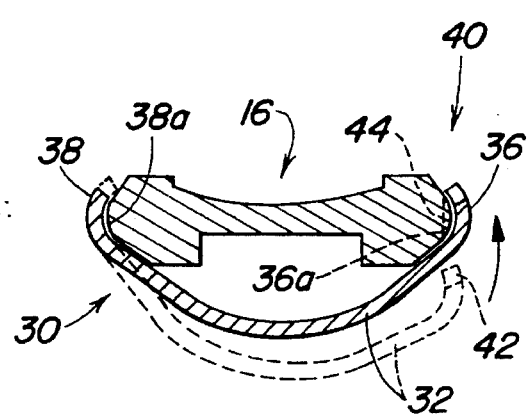
FIG. 4 is a view taken essentially along lines 4—4 of FIG. 3 (solid lines) and showing in broken lines the connecting portion of the sweep as the sweep is being rotated into position at the mounting area on the adaptor.

As shown in the drawings and described in detail below, the indexing structure 40 on the sweep 18 includes a notch 42 formed in the flange 36 and a complimentary tab or projection 44 in the adaptor 16 so that at the mounting location the flange 36 can be rotated into position when the flange 38 is positioned against the opposite side of the adaptor 16 (broken lines of FIG. 4). Once rotated into position (FIGS. 3 and 4), the connecting portion 30 is slidable on the adaptor 16 upwardly from the mounting location to a wedge-lock position wherein the sweep 18 is retained in the field-working position. If dislodged from the wedge-lock or field-working position, the sweep 18 will slide downwardly under the influence of gravity, but the flared transition areas 39 will contact the lower end of the adaptor 16 to prevent the sweep 18 from falling from the end of the shank. The adaptor 16 includes first and second vertically offset primary and secondary wedging or tapered portions 48 and 49. As shown in FIG. 3, the portion 48 is located near the top of the adaptor 16 above the mounting location and the sides 36a and 38a taper outwardly in the upward direction to provide frictional engagement of the connecting portion 30 as the sweep is forced upwardly (arrow A1) on the adaptor by impact or by the force exerted on the sweep during operation in the soil. The second portion 49 is oppositely tapered, widening in the downward direction, to engage the transition areas 39 and act as a secondary or down limit stop when the sweep is dislodged and moves downwardly from field-working position (arrow A2). Preferably, the width of the narrowest portion of the adaptor 16 between the portions 48 and 49 is no less than, and ideally is slightly greater than, the width of the neck or connecting portion 30 to allow sweep mounting and removal at the mounting location only. Also, to maintain a close fit between the connecting portion 30 of the sweep and the adaptor 16 when the sweep is dislodged from the field-working position, the distance the sweep moves downwardly in the direction A1 is kept at a minimum. The close fit in the dislodged condition reduces the likelihood that the sweep will fall of the end of the shank 12.

To facilitate positioning of the sweep 18 relative to the adaptor 16 at the mounting position, a line or similar marking 58 (FIG. 5) is provided on the adaptor to align with a top edge 60 on the connecting portion 30 of the sweep. To mount the sweep 16 on the shank 12 or 12a, the flange 38 is positioned against the corresponding side 38a of the adaptor 16 (broken lines of FIG. 4) and the top edge 60 is aligned with the line 58. Thereafter, the sweep 18 is rotated so the notch 42 moves over the tab 44 until the flange 36 embraces the corresponding side 36a (solid lines of FIG. 4). The sweep 16 is then forced upwardly, by a blow from a hammer for example, to wedge the connecting portion 30 against the tapered portion 48 and frictionally secure the sweep in the field-working position.

To remove the sweep 16, the sweep is driven downwardly to a dislodged position. The taper at 49 prevents the dislodged sweep from falling downwardly off the end of the shank. With the sweep 16 in the position wherein the notch 42 and the tab 44 align (the mounting position), the flange 36 is simply rotated away from the corresponding side 36a of the adaptor 16 (broken lines of FIG. 4) and the sweep is freed from the shank 12.

Having described the preferred embodiment, it will become apparent that various modifications can be made without departing from the scope of the invention as defined in the accompanying claims.

We claim:

1. In a tillage implement having an upright shank, knock-on sweep structure comprising:

a sweep having an upper connecting portion;

an elongated sweep attaching portion located at a lower end of the shank;

the connecting portion and sweep attaching portion including indexing structure facilitating mounting of the connecting portion on the sweep attaching portion at a preselected location along the sweep attaching portion; and wherein the sweep is movable a first direction from the preselected location along the sweep attaching portion to a first securing location wherein the sweep is secured on the sweep attaching portion in a field-working condition; and wherein the sweep is movable a second direction opposite the first direction to a secondary securing location offset from the first securing location in a loss prevention condition.

2. The invention as set forth in claim 1 wherein the first direction is an upward direction and the sweep is secured by friction in the first securing location.

3. The invention as set forth in claim 1 wherein the preselected location is offset vertically from the first and secondary securing locations.

4. The invention as set forth in claim 1 wherein the preselected location is between the first and secondary securing locations.

5. The invention as set forth in claim 1 wherein the sweep attaching portion includes a first taper securing the connecting portion in wedging relationship at the first securing location.

6. The invention as set forth in claim 6 wherein the sweep is movable a second direction opposite the first direction to a second location whereby sweep loss is prevented in the absence of the wedging relationship at the first location.

7. The invention as set forth in claim 6 wherein the sweep attaching portion includes a second taper, the first and second tapers being tapered in opposite directions.

8. The invention as set forth in claim 1 wherein the connecting portion of the sweep includes a shank embracing section, and wherein the indexing structure comprises complimentary sections on the embracing section and the sweep attaching portion.

9. The invention as set forth in claim 1 wherein the connecting portion of the sweep includes a shank embracing portion having first and second inwardly directed flanges, and the sweep is rotatable generally about an upright axis with one of the flanges in engagement with the connecting portion when the sweep is in the preselected location.

10. A sweep having a lower earthworking portion and an upper connecting portion adapted to be mounted on an upright shank portion for forward movement through the soil, the upper connecting portion including a flanged structure adapted to embrace the shank portion to retain the upper connecting portion on the shank portion in a field-working position while permitting limited sliding movement of the sweep along the shank portion when the sweep is dislodged from the field-working position, the connecting portion and shank portion defining a mounting area facilitating movement of the upper connecting portion onto and off of the shank portion when the sweep is located in a preselected mounting location relative to the shank portion, the connecting portion and shank portion further defining a secondary retention area preventing sweep loss from the shank portion when the sweep is dislodged from the field-working position.

11. The invention as set forth in claim 10 wherein the upper connecting portion includes a first area providing a wedging fit between the sweep and the shank portion and securing the sweep to the shank portion in the field-working position.

12. The invention as set forth in claim 11 wherein the upper connecting portion includes a second area offset from the first area and providing interference between the shank portion and the sweep for preventing the sweep from sliding downwardly off the shank portion when the sweep is dislodged from the field-working position.

13. The invention as set forth in claim 11 wherein the sweep, in the field-working position, is offset vertically from the preselected mounting location.

14. The invention as set forth in claim 12 wherein the sweep, in the field-working position, is offset vertically in one direction from the preselected mounting location, and wherein the sweep is offset vertically in the direction opposite the one direction when the sweep is dislodged from the field-working position.

15. The invention as set forth in claim 10 wherein the mounting area comprises an indexing area having a notch located in the flanged structure, the movement of the upper connecting portion onto and off of the shank portion when the sweep is located in the preselected mounting location being generally in a direction having a substantial component normal to a sliding movement direction to thereby reduce possibility of sweep loss as the sweep slides along the shank portion.

16. In an upright shank having a lower tool-receiving portion, shank structure adapted for mounting a sweep with a connecting portion at the lower tool-receiving portion, the shank structure providing limited sliding movement of the sweep vertically relative to the shank, the tool-receiving portion also providing a wedge fit between the sweep and the connecting portion to maintain the sweep on the shank in a field-working position at a preselected mounted location along the shank, the shank structure comprising:

vertically offset primary and secondary retaining portions adapted for engaging the connecting portion at first and second preselected locations, respectively, of the sweep relative to the shank;

the primary retaining portion adapted for engaging the connecting portion when the sweep is in the mounted field-working position; and the secondary retaining portion adapted for engaging the sweep when the sweep is dislodged from the mounted location and slides relative to the shank away from the field-working position, the secondary retaining portion preventing movement of the sweep off of the shank structure to thereby prevent loss of the sweep from the lower tool-receiving portion of the shank.

17. The invention as set forth in claim 16 wherein the primary and secondary retaining portions are wedge-shaped and taper in opposite directions.

18. The invention as set forth in claim 16 including a mounting area located between the lower end of the shank and the primary retaining portion, the mounting area adapted for receiving the connecting portion of the sweep at generally a single location of the sweep relative to the shank.

19. The invention as set forth in claim 18 wherein mounting area is adapted to receive the connecting portion onto the shank by rotational movement of the sweep.

20. The invention as set forth in claim 16 wherein the primary retaining portion comprises a wedge-shaped section.

21. The invention as set forth in claim 20 wherein the secondary retaining portion comprises a second wedge-shaped section adapted to contact an area of the sweep joining the connecting portion and a main body of the sweep.

22. The invention as set forth in claim 16 wherein the primary and secondary retaining portions are formed integrally with the shank.

\* \* \* \* \*